US008096313B1

(12) United States Patent
Kah

(10) Patent No.: US 8,096,313 B1
(45) Date of Patent: Jan. 17, 2012

(54) METHOD AND DEVICE FOR COMMUNICATING ELECTRICAL POSITIONING INFORMATION OF A FINAL CONTROL ELEMENT

(75) Inventor: Harald Kah, Brechen (DE)

(73) Assignee: Samson Aktiengesellschaft, Frankfurt (DE)

( * ) Notice: Subject to any disclaimer, the term of this patent is extended or adjusted under 35 U.S.C. 154(b) by 1282 days.

(21) Appl. No.: 12/017,374

(22) Filed: Jan. 22, 2008

(30) Foreign Application Priority Data

Jan. 30, 2007 (DE) ......................... 10 2007 004 595

(51) Int. Cl.
*F16K 37/00* (2006.01)

(52) U.S. Cl. .... 137/1; 137/554; 324/207.2; 324/207.21; 324/207.24; 340/686.1

(58) Field of Classification Search .............. 137/1, 552, 137/554; 324/207.2, 207.21, 207.24, 207.26; 340/635, 679, 686.1
See application file for complete search history.

(56) References Cited

U.S. PATENT DOCUMENTS 4,321,946 A * 3/1982 Paulos et al. .................. 137/554
5,193,568 A * 3/1993 Eissenberg et al. ............... 137/1
5,236,011 A * 8/1993 Casada et al. ................. 137/554
5,826,616 A * 10/1998 Golden ......................... 137/554
6,137,403 A * 10/2000 Desrochers et al. ........ 340/686.1
6,597,290 B2 * 7/2003 Mogi ......................... 340/686.1
6,895,997 B2 * 5/2005 Qu et al. ....................... 137/554
6,992,478 B2 * 1/2006 Etherington et al. ....... 324/207.2
7,088,096 B2 * 8/2006 Etherington et al. .... 324/207.24
2005/0062468 A1 * 3/2005 Wayama .................... 324/207.2

FOREIGN PATENT DOCUMENTS

DE 42 43 779 A1 6/1994
DE 203 80 325 U1 6/2004

* cited by examiner

*Primary Examiner* — John Rivell
(74) *Attorney, Agent, or Firm* — Schiff Hardin LLP

(57) ABSTRACT

In a method for communicating electrical positioning information of an actuator-positioned final control element such as a valve element, the positioning information resulting from continually sensing the position of the final control element, a binary signal is formed or received signalling a condition 0 (zero) when the final control element has attained a predefined position and a condition 1 (one) when the final control element has not attained the predefined position or the predefined position range. For forming a positioning signal, the corresponding signal condition of the binary signal and the associated continually sensed positioning information are combined such that the corresponding signal condition of the binary signal or the positioning information or both can be optionally invoked from the positioning signal.

28 Claims, 1 Drawing Sheet

METHOD AND DEVICE FOR COMMUNICATING ELECTRICAL POSITIONING INFORMATION OF A FINAL CONTROL ELEMENT

BACKGROUND

The preferred embodiment relates to a method and device for communicating electrical positioning information of an actuator-positioned final control element such as a valve element. The positioning information is usually continually sensed with the aid of an analog sensor for implementing display and/or closed loop control of the position.

It is particularly in the field of process engineering and nuclear technology that final control valves are used in flow lines which, due to stringent safety requirements, are actuated by pneumatic actuators. These so-called field devices are usually also designed to automatically position in an emergency, for example, to close the valve element.

"Seeing" that this position really has been attained in an emergency is vital to safe operation. Known are alarm units such as the so-called namur contact as per the EN 60947-5-6 directive which is usually configured as an inductive proximity switch that transmits a binary signal to a display, by means of which the system can "see" whether the valve element has assumed the alarm position, i.e. the desired emergency position, or not.

Continually sensing the position for example by means of a Hall sensor has the known advantage over a simple alarm that closed loop control of positioning in accordance with the desired flow in the conduits and watchdogging the precise travel of the valve element in an emergency are possible. On the other hand, however, the simple alarm approach has the advantage of a low electrical energy requirement and safe functioning which is most welcome especially in an explosive hazard environment. To satisfy all safety aspects involved it would be a good thing to make available both a continual sensing of the position and an alarm for the field device concerned. Unfortunately this involves an expensive and complicated design.

SUMMARY

An object is to overcome the drawbacks of prior art in designing particularly a method and device for transmitting electrical positioning information of an actuator-positioned final control element such as a valve element at minimum expense and complications in keeping with the advantages of continual position sensing while satisfying the requirement for a low energy consumption.

In a method for communicating electrical positioning information of an actuator-positioned final control element, the positioning information resulting from continually sensing a position of the final control element, a binary signal is formed or received having the signal condition 0 when the final control element has attained a predefined position or position range, and a signal condition 1 when the final control element has not attained a predetermined position or the position range. For forming a positioning signal, the signal condition of the binary signal and the continuously sensed positioning information are combined such that the signal conditions of the binary signal, the positioning information, or both can be optionally invoked from the positioning signal.

DESCRIPTION OF THE PREFERRED EMBODIMENT

Figure 1:
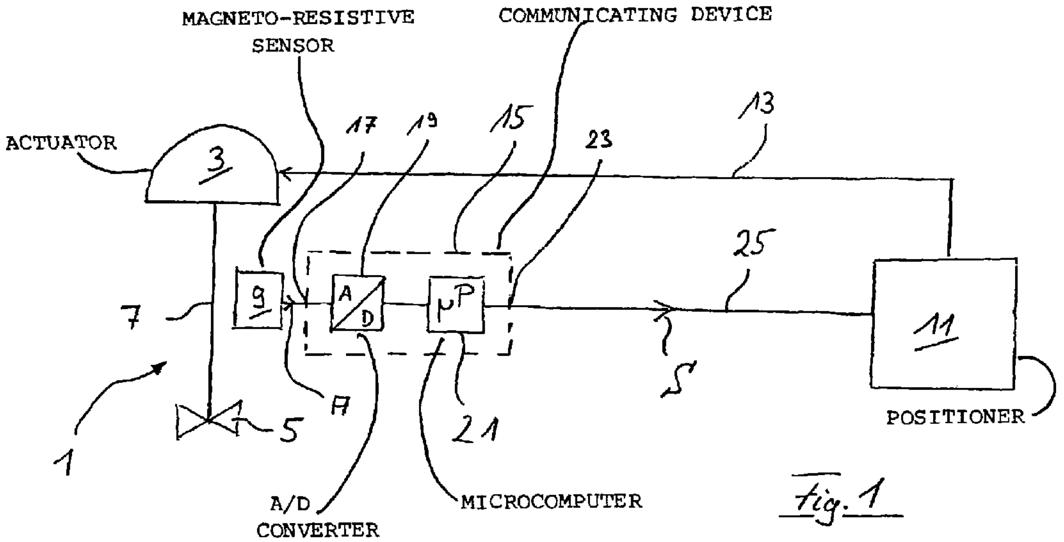
FIG. 1 is a block diagram of the structure of a field device actuated by a pneumatic actuator featuring a device in accordance with the preferred embodiment.

For the purposes of promoting an understanding of the principles of the invention, reference will now be made to the preferred embodiment/best mode illustrated in the drawings and specific language will be used to describe the same. It will nevertheless be understood that no limitation of the scope of the invention is thereby intended, and such alterations and further modifications in the illustrated device and such further applications of the principles of the invention as illustrated as would normally occur to one skilled in the art to which the invention relates are included.

In accordance with the preferred embodiment, continually sensed positioning information is now provided both for the method and for the device, on the basis of which the binary signal is to be formed or received signalling the condition 0 when the final control element has attained a predefined position, such as an emergency position or a predefined position range, and signalling the condition 1 when the final control element has not attained the predefined position or the predefined position range. In accordance with the preferred embodiment the alarm function, particularly emergency watchdogging, is now achieved with the aid of continually sensed positioning information without the need of such hardware as contact makers or inductive proximity switches for signalling the alarm. In accordance with the preferred embodiment the continually sensed positioning information and the binary signal developed therefrom are now combined such that a positioning signal is formed from which optionally the corresponding signal condition of the binary signal or the positioning information or both can be invoked. In other words, in accordance with the preferred embodiment just one positioning signal is now produced which provides information both as to the continually sensed position and as to the alarm, i.e. depending on the energy available the corresponding information can be invoked as a function of the operating situation.

The binary signal having a condition 0 (zero) shall be considered as a "living" zero point, i.e. it represents in its condition, as in the condition 1 (one), as a certain physical value, for example an electrical current of below 1.5 mA and above 1.8 mA, respectively, or an electrical voltage. The binary signal can be produced by a so-called Namur-contact which is a limit switch.

Additionally, it shall be clear that instead of the positioning information other types of information can be combined with the binary signal, such as diagnostic data, device characterizing data, calibration data, etc.

Further, it shall be clear that the positioning signal generated by combining the binary signal to which the analog signal is modulated, can be transferred bidirectional particularly between a limit switch generating the binary signal, and a control system.

It will be appreciated that the positioning signal produced by this combination can now transmit not just binary information and continually sensed positioning information simultaneously via a single signal line, but also additional information data, for example, in the form of a data packet relating to the profile, such as the distance/time profile of the positioning motion of the actuator in the position as currently sensed. In addition, the positioning signal may include diagnostic information. Should, for example, attaining the current position as indicated by the distance/time profile be slower than wanted, the positioning signal can include "too slow" diagnostic information in combination.

In a preferred aspect, to form the positioning signal the continually sensed positioning information is modulated on the binary signal, i.e. use being made of the binary signal as an electrical signal carrier.

Preferably the continually sensed positioning information when comprising analog information is digitized before being combined with the binary signal.

To achieve an optimally simple combination of each signal condition and the corresponding positioning information the continually sensed positioning information is frequency modulated for combination with the binary signal in making use of a data communication protocol such as the HART protocol.

In another preferred aspect communication may be made also opposite to the direction in which the positioning signal is transmitted, i.e. in the direction of the device in accordance with the preferred embodiment in which the binary signal is combined with the continually sensed positioning information signal. For example, a setpoint value such as a position alarm for generating the binary signal may be set by the communication in the opposite direction when desired, in that the desired setpoint value is communicated to the device in accordance with the preferred embodiment via the signal communication line for the combined positioning signal.

To save even more energy and to permit reacting to corresponding operating situations for providing high or low levels of energy, the method in accordance with the preferred embodiment can be designed to reduce the positioning signal to the corresponding signal condition of the binary signal so that only the positioning signal reduced to the corresponding signal condition is output, as may be particularly of advantage when the energy of the operating condition of the actuator is low or insufficient for the continually sensed positioning information prompting a relatively high energy requirement.

In an operating condition during which a change, particularly suddenly or closed loop control of the positioning motion of the final control element is desired, the positioning signal can be likewise reduced, namely exclusively to the continually sensed positioning information without the corresponding signal condition of the binary signal, the corresponding reduced signal then being forwarded.

In another preferred aspect in particular a non-volatile memory for the positioning signal is provided so that it can only be cached for a certain period of time, on timeout of which the non-volatile memory can be overwritten with the new positioning signals in thus ensuring that in an emergency situation in which the corresponding final control element is deactivated it is always the last positioning signal data that is cached non-volatile.

In still another preferred aspect of the device in accordance with the preferred embodiment an electronic component, particularly a microchip is provided which generates the binary signal on the basis of the continually sensed positioning information. In addition, an electronic module, particularly a microchip may be provided which processes the corresponding signal condition and the positioning information associated therewith to form the positioning signal. The electronic module may comprise a microcomputer which modulizes the positioning information on the binary signal, particularly in making use of a HART protocol.

In yet another preferred aspect of the preferred embodiment the electronic component and the electronic module are achieved as a module, such as a microcomputer, the microcomputer thus being able to undertake both modulation and generation of the binary signal.

Preferably an analog to digital converter for digitizing the positioning information is inserted immediately downstream of the input of the device and preferably upstream of the electronic module and electronic component.

In addition, the device in accordance with the preferred embodiment may comprise a filter for reducing the positioning signal to just the binary signal or just to the positioning information.

Preferably the output of the device is connected to a two-wire line for forwarding the positioning signal.

In addition, the preferred embodiment relates to a sensor, particularly a Hall sensor or a magneto-resistive sensor particularly intended for analog detection of the position of a final control element, such as a valve element, positioned by an actuator, the sensor being provided with a device in accordance with the preferred embodiment.

Referring now to FIG. 1 there is illustrated a field device in accordance with the preferred embodiment, such as a final control valve assembly identified in general by the reference numeral 1. The field device 1 comprises a pneumatic actuator 3 actuating a final control valve 5 via a valve stem 7. A magneto-resistive sensor 9 disposed adjoining the positioning stem 7 senses the position of the stem 7 in detecting the position of a valve element (not shown) of the final control valve 5.

The sensor 9 is connected to a positioner 11 which from a comparison of the setpoint value and actual value outputs a control signal to the pneumatic actuator 3 via a control line 13 and features a position display (not shown).

A device in accordance with the preferred embodiment for communicating a positioning signal S is identified in general in FIG. 1 by the reference numeral 15.

The communicating device 15 comprises an input 17 connecting an analog to digital converter 19. The analog to digital converter 19 digitizes the analog positioning information a sensed by the sensor 9 and passes it on to a microcomputer 21. The microcomputer 21 generates from the positioning information A a binary signal designed like a normal Namur contact and comprising a signalled condition 1 when the final control valve 5 is in a closed position (not shown). If the final control valve 5 permits a flow the binary signal comprises a signalled condition 0

As an alternative, the two functions combined in the microcomputer 21—generating the binary signal and modulating the continually sensed positioning information on the binary signal—can be split into two components. For example, the analog to digital converter 19 could be directly followed by a binary signal generator (not shown) which with the aid of a comparator (likewise not shown) compares the continually sensed positioning information to a positioning alarm and outputs the corresponding binary signal (0/1) to the microcomputer 21 by which then the analog positioning information is modulated on the generated binary signal.

The microcomputer 21 comprises a modulation component (not shown) which modulates the continually sensed, digitized positioning information in accordance with the HART protocol such that the digital positioning information is superimposed in accordance with its frequency on the associated binary signal. The positioning signal S output at the output 23 of the communication device 15 to a two-wire line 25 contains both each signal condition of the binary signal as well as the continually sensed positioning information for retrieval at the positioner 11 and/or is displayed. It will be appreciated that in addition to the binary signal and the continually sensed positioning information other information data and data packets such as the diagnostic results can be included by being modulated on the positioning signal. This additional information data may relate to an adequate travel response of the final control element into the desired position, for instance. But also the distance/time profile of the positioning motion of the final control element can be coupled to the positioning signal with the continually sensed positioning information and the binary signal.

Via the two-wire line 25 a reverse communication can take place, namely in the direction of the communication device 15 to permit, for example, resetting the alarm for the binary signal generator (not shown).

The microcomputer 21 may be designed to reduce the positioning signal S to the continually sensed positioning information A or to the corresponding signal condition of the binary signal. In an emergency situation, for instance, at which only a very low energy supply is available, the microcomputer 21 can reduce the positioning signal just to the binary signal having a low energy requirement, whereas in normal operating in which adequate energy is available, the microcomputer 21 can either leave the positioning signal S unchanged or make the reduction to at least the continually sensed positioning information.

Figure 2:
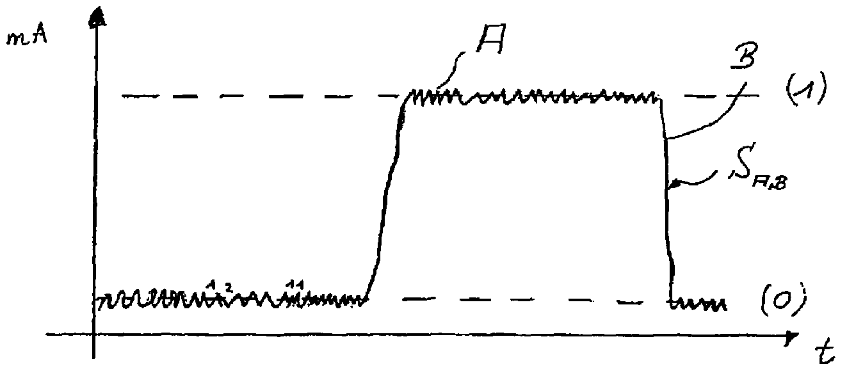
FIG. 2 is a graph plotting an analog positioning information in Ma as a function of time.

Referring now to FIG. 2 there is illustrated a time profile of the positioning signal $S_{AB}$. The stepped basic profile of the positioning signal $S_{AB}$ is induced by the binary signal B whilst the continually sensed digital positioning information A is generated by frequency modulation in superimposing it on the binary signal B in making use of the HART protocol.

While a preferred embodiment has been illustrated and described in detail in the drawings and foregoing description, the same is to be considered as illustrative and not restrictive in character, it being understood that only the preferred embodiment has been shown and described and that all changes and modifications that come within the spirit of the invention both now or in the future are desired to be protected.

I claim as my invention:

1. A method for communicating electrical positioning information of an actuator-positioned final control element, said positioning information resulting from continually sensing a position of the final control element, comprising the steps of:

forming or receiving a binary signal having a signal condition 0 when the final control element has attained a predefined position or position range, and a signal condition 1 when the final control element has not attained the predefined position or the position range; and for forming a positioning signal combining the signal conditions of the binary signal and the continually sensed positioning information such that the signal conditions of the binary signal, the positioning information, or both can be optionally invoked from said positioning signal.

2. A method of claim 1 wherein to form the positioning signal the continually sensed positioning information is modulated onto the binary signal.

3. A method of claim 1 wherein the continually sensed positioning information is digitized before being combined with the binary signal.

4. A method of claim 1 wherein the continually sensed positioning information is frequency modulated for combination with the binary signal.

5. A method of claim 1 wherein the positioning signal is communicated via a single output terminal.

6. A method of claim 1 wherein a method parameter for setting or configuring the method is received for generating the binary signal from the positioning information via a signal line used to communicate the positioning signal.

7. A method of claim 1 wherein in a certain operating mode of the actuator the positioning signal is reduced to the signal conditions of the binary signal and the positioning signal reduced to the signal conditions is output.

8. A method of claim 1 wherein in a certain operating mode the positioning signal is, where necessary, reduced to the continually sensed positioning information and the reduced positioning signal is sent.

9. A method of claim 1 wherein the binary signal indicates MAX or MIN violation of an adjustable position alarm.

10. A method of claim 1 wherein the position is cached for a predetermined period of time of actuator operation.

11. A method of claim 1 wherein in addition to at least one of the binary signal and the associated continually sensed positioning information additional information is attached to the positioning signal assigned to the continually sensed positioning information.

12. A method of claim 1 wherein the predefined position comprises an emergency position.

13. A method of claim 1 wherein the final control element comprises a valve element.

14. A system for transmitting electrical positioning information of an actuator-positioned final control element, comprising:

a communication device having an input for receiving continually sensed positioning information from a sensor and an output for forwarding a positioning signal;

said communication device generating or receiving by way of the positioning information a binary signal signalling a condition 0 when the final control element has attained a predefined position or a predefined position range, and signalling a condition 1 when the final control element has not attained the predefined position or the predefined position range; and said communication device combining the signal conditions of the binary signal and the continually sensed positioning information for forming said positioning signal such that the signal conditions of the binary signal, the positioning information, or both can be optionally invoked from said positioning signal.

15. A system of claim 14 wherein the output is formed by a sole terminal for communicating the positioning signal.

16. A system of claim 14 wherein the communication device is designed to receive a setting for generating the binary signal via a signal line connected to the output.

17. A system of claim 14 wherein the communication device has an electronic module for processing the positioning information for generating the binary signal.

18. A system of claim 14 wherein the communication device has an electronic module which processes the signal conditions and the positioning information for forming the positioning signal.

19. A system of claim 18 wherein the electronic module has a modulation component which modulates the positioning information on the binary signal.

20. A system of claim 18 wherein the electronic module comprises a microcomputer.

21. A system of claim 14 wherein the communication device comprises an analog to digital converter for digitizing the positioning information.

22. A system of claim 14 wherein the communication device comprises a filter for reducing the positioning signal to only the binary signal or the positioning information.

23. A system of claim 14 wherein the output is connected to a two-wire line for forwarding the positioning signal.

24. A system of claim 14 wherein the sensor comprises a Hall sensor or a magneto-resistive sensor for sensing the position of the final control element.

25. A system of claim 14 wherein the control element comprises a valve element.

26. A system of claim 14 wherein the predefined position comprises an emergency position.

27. A system for transmitting electrical positioning information of an actuator-positioned final control element comprising a valve element, comprising:

a communication device having an input for receiving continually sensed positioning information from a sensor positioned to sense a position of said valve element and an output for forwarding a positioning signal;

said communication device generating or receiving by way of the positioning information a binary signal signalling a first condition when the valve element has attained a predetermined position or a predefined position range, and signalling a second condition when the valve element has not attained the predefined position or the predefined position range; and said communication device combining the signal conditions of the binary signal and the continually sensed positioning information for forming said positioning signal such that the signal conditions of the binary signal, the positioning information, or both can be optionally invoked from said positioning signal.

28. A method for communicating electrical positioning information of an actuator-positioned final control element, said positioning information resulting from continually sensing a position of the final control element, comprising the steps of:

forming or receiving a binary signal having a first signal condition when the final control element has attained a predefined position or position range, and a second signal condition when the final control element has not attained the predefined position or the position range; and for forming a positioning signal combining the signal conditions of the binary signal and the continually sensed positioning information such that the signal conditions of the binary signal, the positioning information, or both can be optionally invoked from said positioning signal.

* * * * *